Aug. 31, 1965 H. M. GEYER 3,203,257
ESCAPEMENT CONTROLLED ACTUATOR
Filed Feb. 23, 1962 3 Sheets-Sheet 1

INVENTOR.
Howard M. Geyer
BY
His Attorney

Aug. 31, 1965    H. M. GEYER    3,203,257
ESCAPEMENT CONTROLLED ACTUATOR
Filed Feb. 23, 1962    3 Sheets-Sheet 3

INVENTOR.
Howard M. Geyer
BY
His Attorney

United States Patent Office 3,203,257
Patented Aug. 31, 1965

3,203,257
ESCAPEMENT CONTROLLED ACTUATOR
Howard M. Geyer, Dayton, Ohio, assignor to General Motors Corporation, Detroit, Mich., a corporation of Delaware
Filed Feb. 23, 1962, Ser. No. 175,056
1 Claim. (Cl. 74—1.5)

This invention pertains to fluid pressure operated actuators, and particularly to an actuator assembly embodying escapement speed control means so as to enable synchronization of a plurality of like actuators without mechanical interconnections therebetween.

Heretofore, it has been customary to synchronize the movement of a plurality of like fluid pressure operated linear actuators of the piston and cylinder type by embodying a rotatable shaft in each actuator cylinder, the shaft being operatively connected to the piston so as to rotate in response to piston movement. The rotatable shafts of adjacent actuators are interconnected by mechanical shaft means so as to synchronize the movements of the several actuators. A synchronized actuator system of this type is disclosed in my Patent No. 2,657,539. However, mechanically synchronized actuator systems are not feasible in aircraft installations where the actuators are located substantial distances apart, for instance, on the order of eighty feet, due to the angular deflection, or twist, in the flexible shafts which are normally used to interconnect the actuators. That is, the angular deflection of a flexible shaft having a length of substantially eighty feet is sufficiently great to interfere with the precise synchronization of actuators for adjusting aircraft control surfaces.

The present invention relates to an actuator assembly of the fluid pressure operated linear type embodying self-contained escapement speed control means which control the rate of actuator movement, thus enabling each actuator to be precisely synchronized with a plurality of like actuators without any mechanical interconnections therebetween. Accordingly, among my objects are the provision of a screw and nut type actuator assembly including escapement speed control means; the further provision of an escapement controlled fluid pressure operated linear actuator adapted for synchronous operation with other like actuators; and the still further provision of a pneumatic actuator of the piston and cylinder type including a pendulum operated escapement for controlling the rate of movement thereof in one direction.

The aforementioned and other objects are accomplished in the present invention by interconnecting a torsion pendulum operated escapement with the rotatable member of the actuator so as to control the rate of linear movement of the actuator piston. Specifically, the actuator assembly comprises a cylinder having a reciprocable piston therein capable of fluid pressure operation in opposite directions. The piston is suitably restrained against rotation and is operatively connected to a rotatable screw shaft journalled with the cylinder such that piston movement is dependent upon, and effects, rotation of the screw shaft. The screw shaft is coupled through torque absorbing spring means to a scape wheel. The scape wheel is in turn coupled to a torsion spring biased pendulum weight having a predetermined time of oscillation so as to accurately control the rate of angular movement of the screw shaft, and hence control the rate of linear movement of the piston in one direction.

Accordingly, when the actuator piston is subjected to fluid under pressure in the extend direction, the escapement means controls the speed of rotation of the screw shaft independently of the potential of applied fluid pressure. In this manner a plurality of like actuators can have their movements precisely synchronized without mechanical interconnecting means. The escapement control means is only operative to control the movement of the actuator in one direction. Accordingly, means are provided for disengaging the escapement means during retracting movement of the actuator piston.

Further objects and advantages of the present invention will be apparent from the following description, reference being had to the accompanying drawings, wherein a preferred embodiment of the present invention is clearly shown.

Figure 1:
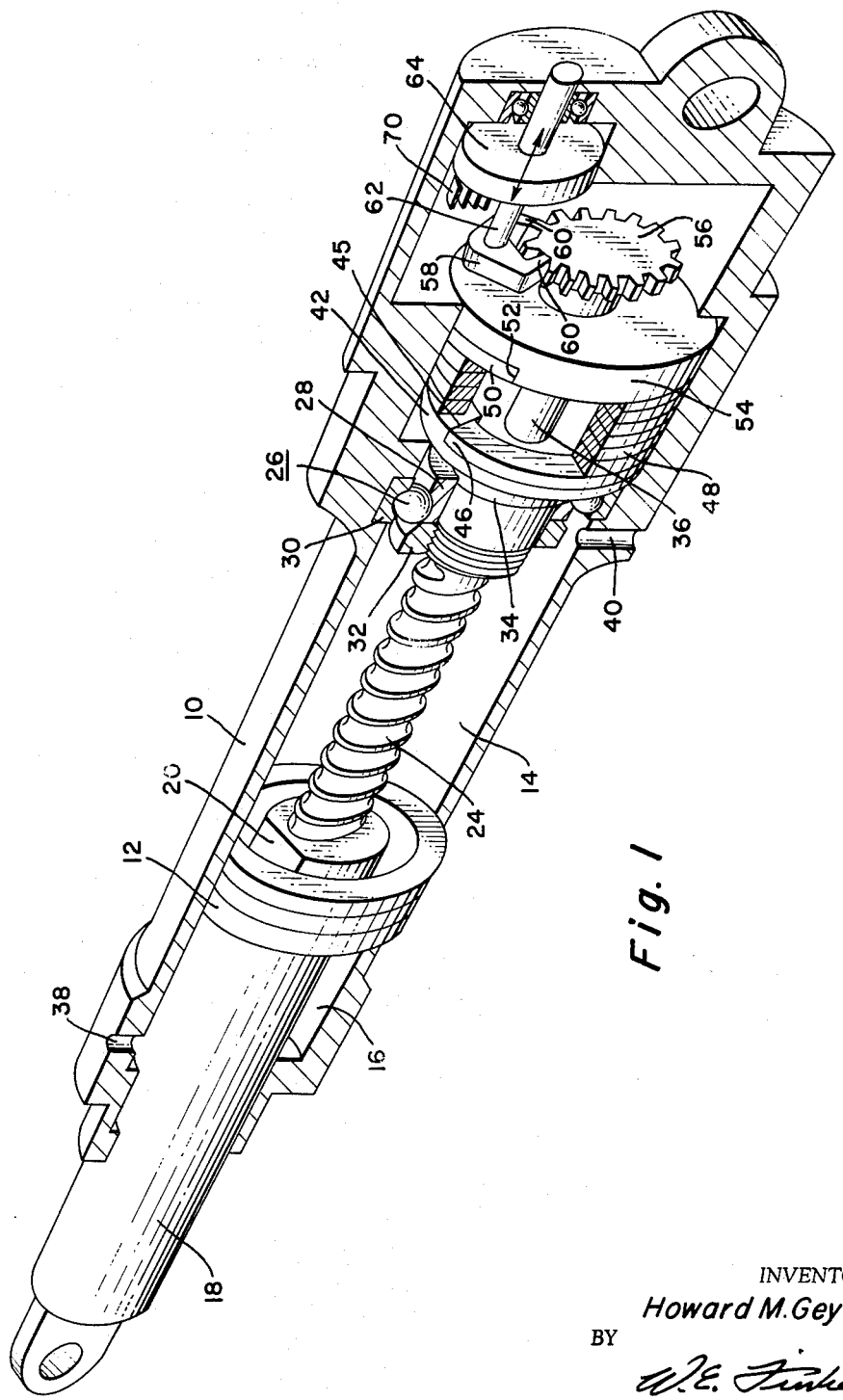
FIGURE 1 is a fragmentary isometric view of an actuator assembly constructed according to the present invention, shown partly in section and partly in elevation.
Figure 2:
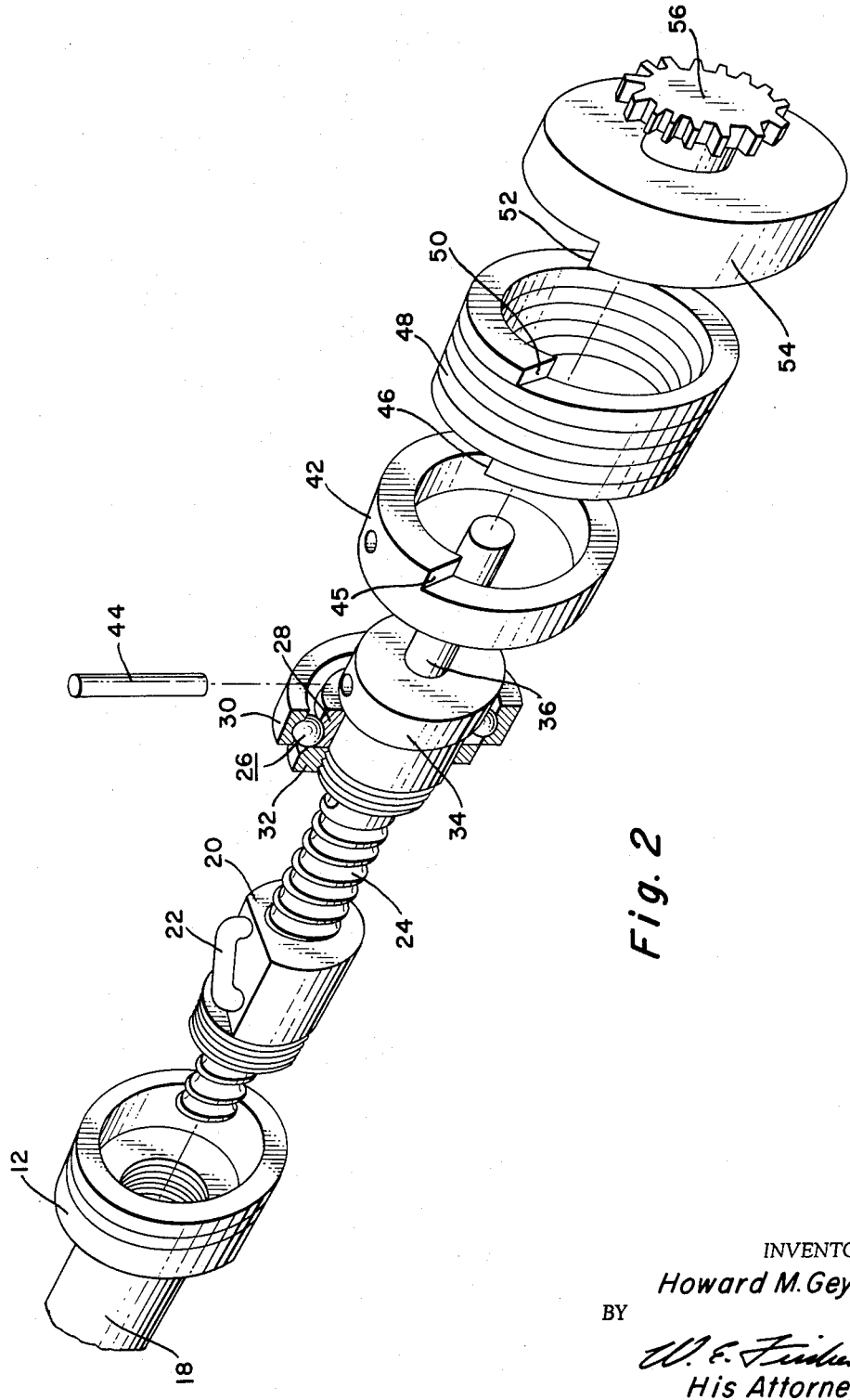
FIGURE 2 is an exploded isometric view of a portion of the actuator assembly shown in FIGURE 1.

With reference to FIGURE 1, the actuator assembly includes a cylinder 10 having a reciprocable piston 12 disposed therein and dividing the cylinder into an extend chamber 14 and a retract chamber 16. The piston 12 is attached to a rod 18 which extends through the tail cap of the actuator cylinder and is adapted for connection to a suitable load device, not shown, which restrains rotation of the piston relative to the cylinder 10. The piston carries a nut 20 constituting a component of a ball screw and nut assembly, the nut including a recirculation tube 22 for the balls as shown in FIGURE 2. The ball nut 20 is threadedly connected with the piston so as to reciprocate therewith and engages a rotatable screw shaft 24 which is journalled by a combined radial and thrust ball bearing assembly 26 in the cylinder 10. The ball bearing assembly 26 includes an inner race 28, an outer race 30, and a retaining nut 32. The screw shaft 24 is formed with a flange, or shoulder, 34 and a pilot shaft extension 36. Since the piston 12 is coupled to the screw shaft 24 through the ball nut 20, it will be appreciated that piston movement is dependent upon, and effects rotation of the screw shaft 24. Accordingly, if the rate of angular movement of the screw shaft 24 is controlled, the rate of linear movement of the piston 12 will likewise be controlled.

In order to effect reciprocable movement of the piston 12, the tail cap of the cylinder is formed with a retract port 38, and the head cap of the cylinder is formed with an extend port 40. When the extend chamber 14 is pressurized through the port 40 the piston 12 will tend to move to the left, as viewed in FIGURE 1, if the retract chamber 16 is exhaused through the port 38. Conversely, if the retract chamber 16 is pressurized through the port 38, the piston will tend to move to the right as viewed in FIGURE 1, when the extend chamber 14 is exhausted to the port 40.

As seen particularly in FIGURE 2, the flange 34 on the screw shaft 24 receives a ring, or annulus, 42 which is rigidly attached thereto by a radially extending pin 44. The ring 42 has a radial shoulder 45 which is engaged by one end 46 of energy or torque absorbing torsion spring 48 coaxial with the ring 42. The other end 50 of the torsion spring engages a radial shoulder 52 on a ring 54 intergral with a toothed scape wheel 56 which is piloted on the stub shaft 36.

The screw 24 has a right hand thread, and accordingly, will rotate in the counterclockwise direction, as viewed in FIGURE 1, during extending movement of the actuator piston 12. Since the ring 42 is pinned to the screw shaft 24 it will likewise rotate in the counterclockwise direction as controlled by the escapement including the scape wheel 56 through the torsion spring 48.

Figure 3:
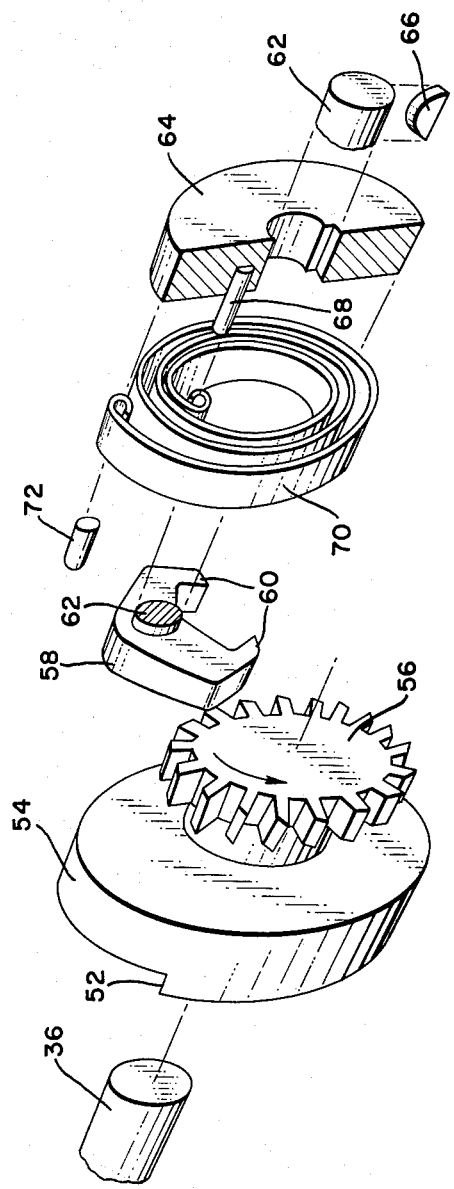
FIGURE 3 is an exploded isometric view of the escapement means.

Movement of the scape wheel 56 is controlled by a pallet member 58 having a pair of spaced pallets 60 engageable with the scope wheel 56. The pallet member 58 is attached to a pendulum shaft 62 journalled in the tailg cap and carrying a pendulum weight 64 which, as shown in FIGURE 3, is attached to the shaft 62 by a key 66. The pendulum weight 64 has an axially projecting pin 68 which receives one end of a torsion spring 70, the other end of which is attached to a stationary anchor pin 72 supported by the head cap of the actuator cylinder 10. The pendulum weight 64 oscillates under the control of the torison spring 70 with the periodicity, or time of oscillation, being determined by the mass of the pendulum weight 64. It will be appreciated that when a plurality of actuators of identical construction are used in an actuator system, the time of oscillation of each pendulum weight will be identical, and in this manner a plurality of actuators can have their movements synchonized without any mechanical interconnections therebetween.

Assuming that the actuator of FIGURE 1 is subjected to a tension load, i.e., a load acting to extend the actuator, or that the extend chamber 14 is subjected to pressure while the retract chamber 16 is connected to drain, the rate of actuator movement will be controlled by the self-contained escapement. Thus, as the piston 12 tends to move outwardly as viewed in FIGURE 1, the screw shaft 24 tends to rotate in the counterclockwise direction, but is only permitted to do so under the control of the escapement. The period of oscillation of the pendulum weight 64 controls the pivotal movement of the pallet member 58, and thus controls the rotation of the scape wheel 56. The scape wheel tends to be driven in the counterclockwise direction through the torsion spring 48 since the end 46 of the spring 48 is engaged by the abutment 45 on the annulus 42, and the end 50 of the spring 48 is engaged by the abutment 52 on the ring 54. The coils of the spring 48 bear against the inner wall of the cylinder, and reduce the screw shaft torque output applied to the escapement proportional to the number of turns.

In order to retract the actuator, the pallet member 58 must be disengaged from the scape wheel 56, and to accomplish this the entire pendulum mechanism is axially moved relative to the actuator cylinder. Axial movement of the pendulum mechanism to a position where the pallet member 58 is disengaged from the scape wheel 56 can be effected either manually, or by means of a screw.

While the embodiment of the invention as herein disclosed constitutes a preferred form, it is to be understood that other forms might be adopted.

What is claimed is as follows:

In a screw and nut type actuator, a screw shaft, bearing means rotatably journalling said screw shaft, torque absorbing coil spring operatively associated with said screw shaft, and pendulum actuated escapement means operatively connected to said screw shaft through said spring for controlling the rate of rotation of said screw shaft.

References Cited by the Examiner

UNITED STATES PATENTS

| 455,364 | 7/91 | Shaw | 188—85 |
|---|---|---|---|
| 689,703 | 12/01 | Brown | 188—85 |
| 1,557,944 | 10/25 | Reisbach. | |
| 1,690,646 | 8/59 | Meyer | 121—40 |
| 2,372,693 | 4/45 | Swift. | |
| 2,871,702 | 2/59 | Tetro | 74—1.5 |
| 2,898,888 | 8/59 | Geyer | 92—33 |
| 2,970,427 | 2/61 | Douglass | 58—17 |
| 2,979,034 | 4/61 | Geyer | 92—17 |
| 3,125,890 | 3/64 | Dillon et al. | 74—1.5 |
| 3,137,123 | 6/64 | Dinerstein et al. | 74—1.5 |

FOREIGN PATENTS

| 602,471 | 7/60 | Canada. |
|---|---|---|
| 738,356 | 10/55 | Great Britain. |

OTHER REFERENCES

International Business Machines Bulletin, vol. 2, No. 5, 2/60.

BROUGHTON G. DURHAM, *Primary Examiner*.

RALPH H. BRAUNER, *Examiner*.